Patented Jan. 20, 1948

2,434,874

UNITED STATES PATENT OFFICE 2,434,874

SEPARATION OF STARCH AND PROTEIN IN WHEAT GRAIN PRODUCTS AND EXTRACTION OF DIASTASE THEREFROM

Irwin W. Tucker and Arnold K. Balls, Washington, D. C., assignors to the United States of America, as represented by the Secretary of Agriculture No Drawing. Application June 5, 1943,
Serial No. 489,818

2 Claims. (Cl. 195—66)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a process of separating starch and protein from wheat grain products and extracting diastase therefrom.

Copending application, Serial No. 484,080, filed April 22, 1943, describes a process for the separation of diastase from grains. In general, according to the process of the application, wheat is comminuted and the comminuted wheat products are mixed with an aqueous solution of an agent (preferably sodium sulfite solution in a concentration of about from 0.01 percent to 0.10 percent) to form a slurry. The agent reduces the proteolytic enzymes contained in the wheat without destroying them, resulting in their digestion of the proteins and liberation of the diastase in a water-soluble form. The treatment is effected by mixing the wheat product and the sodium sulfite solution in the proportion of about 1 bushel of the grain to from 25 gallons to 35 gallons of the solution at a temperature below that which destroys enzymes, not substantially over 70° C. The time may be varied, depending on the temperature, but ordinarily is that sufficient to permit digestion of the proteins by the activated proteolytic enzymes to liberate the diastase, one hour at 45° C. being satisfactory. The mixture is then allowed to settle and the liquid containing the diastase is removed. The settlings, consisting principally of the starch, are then cooked to gelatinize the starch, cooled, and the diastase-containing liquid is added to the gelatinized starch to form sugar, following which the mash is fermented in the usual manner.

Normally, when comminuted wheat products, such as wheat flour, are wetted, the gluten forms a dough and the starch particles are enmeshed therein. This behavior is a peculiarity of wheat gluten and renders it difficult to separate the gluten from the starch. According to one conventional process, the comminuted wheat products are repeatedly washed and beaten to remove the starch. This at best is tedious, and does not result in a high degree of separation.

It will be noted, according to the process above described relative to Serial No. 484,080, that most of the proteins are contained in the diastase-containing liquid, and are returned to the mash and remain therein during fermentation. This has objectionable features, in that valuable protein constituents of the wheat are lost, especially if the residue mash is not further used; the proteins form fusel oils in the alcohol produced; the proteins, because of their sticky nature, clog the screens and pipes of the distilling apparatus; and, in instances where it is necessary to discharge the distillery residue mash into sewage, undue sewage contamination results.

It is the object of this invention to remove at least a substantial part of the proteins from the mash, in a simple manner prior to fermentation; to recover the proteins in a valuable form; to separate protein from starch; and such other objects as will be apparent from the description of the invention and the appended claims.

There are many reducing agents suitable for use in the process. The reducing action is a straight organic reduction, or addition of hydrogen, as exemplified by the reduction of cystine to cysteine, that is, the reducing agent is one which breaks the sulfur to sulfur bond of the proteolytic protein of the wheat and adds hydrogen to at least one of the sulfurs. It is essential that the reducing agent be one which does not destroy the enzymes. The following list, although not exclusive of others, is cited by way of examples.

Ascorbic acid
Arsenious oxide and other arsenious compounds
Glucic acid
Hydrogen sulphide and soluble sulphides
Cysteine, glutathione and other sulphydryl compounds
Sulphites, bisulphites, sulphur dioxide
Hydrosulphite
Thiosulphates
Hydrogen cyanide and soluble cyanides
Certain proteins, peptides and peptones that possess sulphydryl groups Of the above, all are not equally good for the process, and some of them need to be neutralized. From the standpoint of economy and availability, certain $SO_2$ yielding agents, such as sulphur dioxide and the sulphite salts, particularly sodium sulphite and sodium bisulphite, are preferred.

We have discovered that the action of the reducing agent is such as to digest the proteins in a manner that results in their releasing the starch and their clotting. When the mixing is effected by apparatus conventionally used in the mash-mixing step in fermenting processes, we have found that certain quantities of gas, such as air, are entrapped in the mash, by beating provided that some of the paddles or arms of the mixing apparatus are not completely submerged in the liquid at all times during their revolutions, and that these quantities of gas occlude with the protein particles, causing them to rise as a scum while the starch settles, whereby, after settling the mixture, the proteins may readily be removed from the liquid in any desired manner.

The removed scum consists of practically pure wheat protein. Residual liquid may be readily pressed out or drained away, and the remainder dried to a non-hydroscopic friable material suitable for the varied uses of wheat glutens. Using wheat flour, tests show a protein yield as high as 90 percent of the total protein contained in the flour.

After removal of the scum, the diastase-containing liquid is recovered by removing it from the settled starch, and these products are used for the same purpose and in the same manner as indicated above in reference to the copending application.

Having thus described the invention, what is claimed is:

1. A process for separating wheat gluten from wheat starch and for extracting diastase from wheat grain products, comprising comminuting wheat, mixing the comminuted wheat product with a neutralized aqueous solution of a sulphite salt, at a temperature below that which destroys enzymes, thereby to digest the protein particles and release the starch enmeshed in the particles and to cause liberation of the diastase in water-soluble form, settling the mixture to allow the protein particles to rise as a scum while the starch settles, removing the scum, and recovering the liquid containing the diastase from the remaining mixture.

2. The process of claim 1 wherein the sulphite salt is sodium sulphite.

IRWIN W. TUCKER.
ARNOLD K. BALLS.

REFERENCES CITED

The following references are of record in the file of this patent:

UNITED STATES PATENTS

| Number | Name | Date |
|---|---|---|
| 1,153,640 | Pollak | Sept. 14, 1915 |
| 1,955,112 | Curry | Apr. 17, 1934 |
| 1,964,754 | Williams | July 3, 1934 |
| 2,001,925 | Thurber | May 21, 1935 |
| 2,103,443 | Balls & Hale | Dec. 28, 1937 |
| 2,228,717 | Bergquist | Jan. 14, 1941 |
| 2,322,413 | Bishop | June 22, 1943 |
| 2,368,668 | Langford | Feb. 6, 1945 |

FOREIGN PATENTS

| Number | Country | Date |
|---|---|---|
| 2,840 | Great Britain | 1881 |
| 677,662 | Germany | Jan. 12, 1931 |

OTHER REFERENCES

Jorgensen, On the Existence of Powerful but Latent Proteolytic Enzymes in Wheat Flour, Cereal Chem., vol. XIV, No. 3, May 1936, pages 346–355.

Balls & Hale, Proteolytic Enzymes of Flour, Cereal Chem., vol. XIII, No. 1, Jan. 1936, page 58.

Chemical Abstracts 35:2174[5] Dull and Swanson, The nature of liberation of bound barley amylase as effected by salt solutions. Cereal Chemistry 18, 113–20 (1941).

Thorpe, Dictionary of Applied Chemistry, vol. VI, Longmans, Green & Co., Ltd., N. Y. 1926, pages 366, 367. (Copy in Div. 6.)